United States Patent
Chen et al.

(10) Patent No.: US 10,141,828 B2
(45) Date of Patent: Nov. 27, 2018

(54) MAXIMUM POWER POINT TRACKING METHOD AND SYSTEM THEREOF

(71) Applicant: DELTA ELECTRONICS, INC., Taoyuan (TW)

(72) Inventors: Sin-Hong Chen, Taoyuan (TW); Ho Huang, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/798,379

(22) Filed: Oct. 30, 2017

(65) Prior Publication Data
US 2018/0309355 A1  Oct. 25, 2018

(30) Foreign Application Priority Data

Apr. 20, 2017 (TW) .............................. 106113222 A

(51) Int. Cl.
| | | |
|---|---|---|
| G05F 5/08 | (2006.01) | |
| H02M 1/00 | (2006.01) | |
| H02M 3/04 | (2006.01) | |

(52) U.S. Cl.
CPC ............... *H02M 1/00* (2013.01); *H02M 3/04* (2013.01); *H02M 2001/0009* (2013.01)

(58) Field of Classification Search
CPC ... H02M 1/00; H02M 3/04; H02M 2001/0009
(Continued)

(56) References Cited

U.S. PATENT DOCUMENTS 6,081,104 A * 6/2000 Kern ..................... H02J 9/065
 320/101
6,844,739 B2 * 1/2005 Kasai ..................... G05F 1/67
 323/284

(Continued)

FOREIGN PATENT DOCUMENTS

| CN | 103365333 A | 10/2013 |
|---|---|---|
| EP | 2657804 A1 | 10/2013 |
| TW | 201324074 A1 | 6/2013 |

OTHER PUBLICATIONS

Zheng Zhaghong et al: An Improved MPPT Algorithm for Photovoltaic Inverter, 2016 8th International Conference on Intelligent Human-Machine Systems and Cybernetics (IHMSC), IEEE, vol. 2, Aug. 27, 2016 (Aug. 27, 2016), pp. 168-173, XP033023654, DOI: 10.1109/IHMSC.2016.39 [retrieved on Dec. 14, 2016].

(Continued)

*Primary Examiner* — Adolf Berhane
*Assistant Examiner* — Nusrat Quddus
(74) *Attorney, Agent, or Firm* — CKC & Partners Co., Ltd.

(57) ABSTRACT

A maximum power point tracking method includes: configuring a voltage tuning direction of a power converter by a process circuit such that the input voltage of the power converter changes in a positive or a negative trend; detecting the corresponding input voltage and input current of the power converter sequentially to obtain multiple powers; and when the powers decrease for N times continuously, change the voltage tuning direction of the power converter such that the change of the input voltage switches from positive trend to negative trend, or from negative trend to positive trend, in which N is an integer greater than or equal to 2.

20 Claims, 9 Drawing Sheets

(58) Field of Classification Search
USPC .............. 307/18; 320/101; 323/282–289, 299
See application file for complete search history.

(56) References Cited

U.S. PATENT DOCUMENTS

| | | | | |
|---|---|---|---|---|
| 9,870,016 | B2* | 1/2018 | Adest | G05F 1/67 |
| 2009/0284078 | A1 | 11/2009 | Zhang et al. | |
| 2011/0134668 | A1* | 6/2011 | Cho | G05F 1/67 |
| | | | | 363/78 |
| 2011/0298305 | A1* | 12/2011 | Chisenga | H02M 3/156 |
| | | | | 307/151 |
| 2012/0026758 | A1* | 2/2012 | Lee | H02M 3/33576 |
| | | | | 363/21.13 |
| 2012/0155126 | A1* | 6/2012 | Yoneda | H02J 3/383 |
| | | | | 363/40 |
| 2012/0205974 | A1* | 8/2012 | McCaslin | H02J 3/385 |
| | | | | 307/18 |
| 2013/0033113 | A1* | 2/2013 | Huang | H02J 3/385 |
| | | | | 307/77 |
| 2013/0046416 | A1 | 2/2013 | Osako et al. | |
| 2015/0137606 | A1* | 5/2015 | Adest | H02J 3/385 |
| | | | | 307/77 |

OTHER PUBLICATIONS

D. Sera et al: Improved MPPT method for rapidly changing environmental conditions, 2006 IEEE International Symposium on Industrial Electronics, Jul. 9, 2006 (Jul. 9, 2006),-Jul. 12, 2006 (Jul. 12, 2006), pp. 1420-1425, XP055044309, DOI: 10.1109/ISIE.2006. 295680 ISBN: 978-1-42-440496-4.
The pertinent parts of US20130046416A1.

\* cited by examiner

MAXIMUM POWER POINT TRACKING METHOD AND SYSTEM THEREOF

RELATED APPLICATIONS

This application claims priority to Taiwan Application Serial Number 106113222, filed Apr. 20, 2017, which is herein incorporated by reference.

BACKGROUND

Technical Field

The present disclosure relates to a solar power generation system, and in particular, to a maximum power point tracking method in the solar power generation system.

Description of Related Art

As the rising awareness on environment issues, renewable energy such as solar power has been taken seriously. In solar power generation systems today, a maximum power point tracking (MPPT) control strategy is applied to improve the output power of the solar PV panels.

However, due to the inconsistent resolution of the signal conversion in the system, the change of the power may be misread when the system calculating the output power of the solar PV panels, which results in the malfunction of the control of the maximum power point tracking and the failure of operating the system at the desired operating point. Therefore, an important area of research in the field involves ways in which to improve the existing maximum power point tracking method.

SUMMARY

One aspect of the present disclosure is a maximum power point tracking method. The maximum power point tracking method includes: configuring a voltage tuning direction of a power converter by a process circuit, such that an input voltage of the power converter changes in a positive trend or in a negative trend; detecting the input voltage and an input current of the power converter at a first time point to obtain a first power value; detecting the input voltage and the input current of the power converter at a second time point after the first time point to obtain a second power value; detecting the input voltage and the input current of the power converter at a third time point after the second time point to obtain a third power value; and changing the voltage tuning direction of the power converter on the condition that the first power value is greater than the second power value, and the second power value is greater than the third power value, such that the change of the input voltage switches from the positive trend to the negative trend, or from the negative trend to the positive trend.

Another aspect of the present disclosure is a maximum power point tracking method. The maximum power point tracking method includes: configuring a voltage tuning direction of a power converter by a process circuit such that an input voltage of the power converter changes in a positive or a negative trend; detecting the corresponding input voltage and input current of the power converter sequentially to obtain multiple power values by a detecting circuit; and on the condition that the power values decrease for N times continuously, changing the voltage tuning direction of the power converter such that the change of the input voltage switches from a positive trend to a negative trend, or from a negative trend to a positive trend, wherein N is an integer greater than or equal to 2.

Yet another aspect of the present disclosure is a maximum power point tracking system. The maximum power point tracking system includes a power converter, a detecting circuit and a processing circuit. The power converter is electrically coupled to a solar power module and configured to receive an input voltage from the solar power module and convert the input voltage to an output voltage. The detecting circuit is electrically coupled to the power converter and configured to detect the input voltage and an input current. The processing circuit is electrically coupled to the power converter and the detecting circuit, and configured to output a control signal to control the power converter according to the input voltage and the input current of the power converter. The processing circuit is configured to output the corresponding control signal to control the input voltage of the power converter changes in a positive trend or in a negative trend, and obtain multiple power values according to the input voltage and the input current. On the condition that the processing circuit is operated under a power point tracking mode, the processing circuit is configured to output the corresponding control signal to change a voltage tuning direction of the power converter such that the change of the input voltage switches from a positive trend to a negative trend, or from a negative trend to a positive trend if the power values decrease for N times continuously, in which N is an integer greater than or equal to 2.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
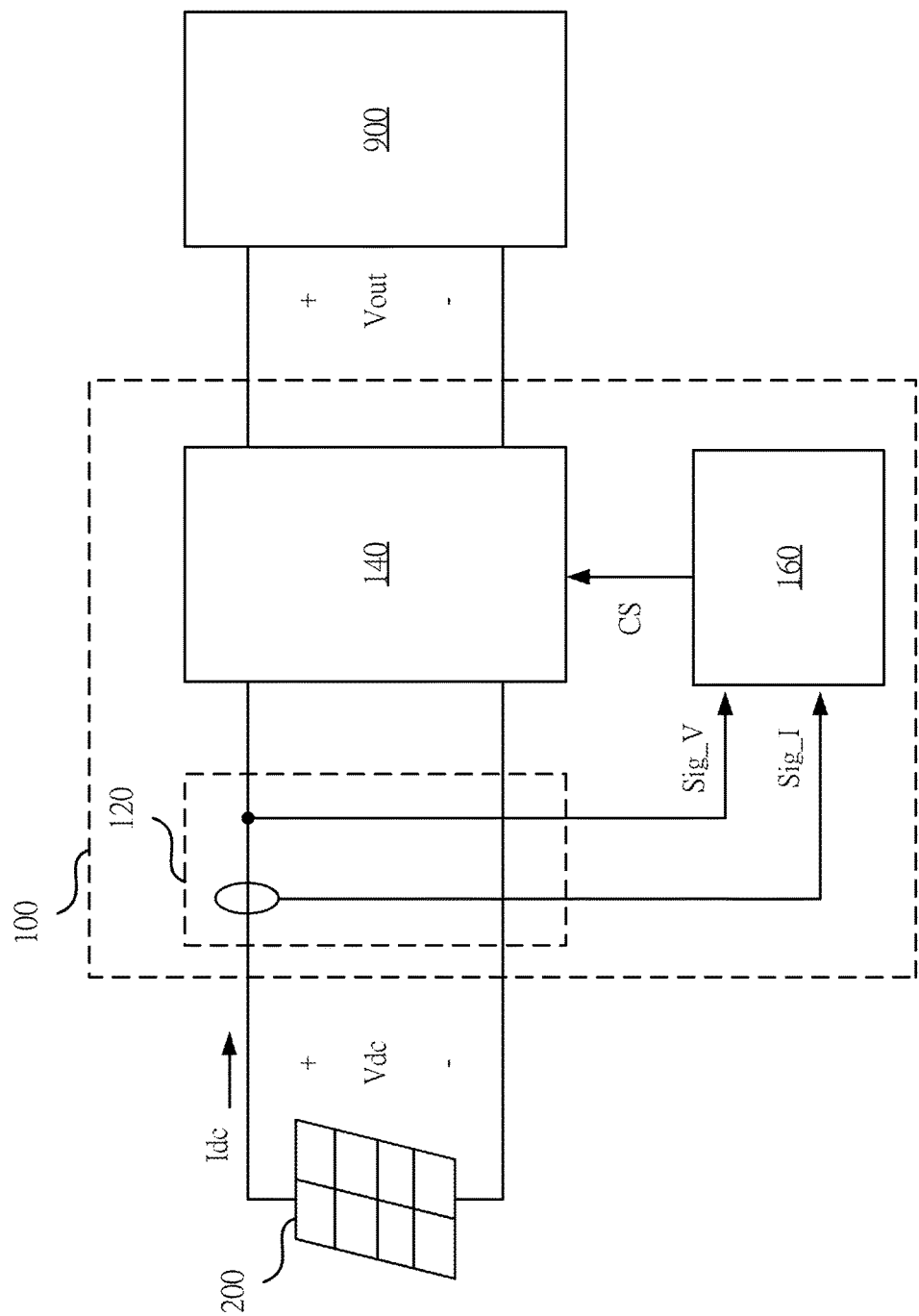
FIG. 1 is a diagram illustrating a solar power generation system according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a solar power generation system according to some embodiments of the present disclosure. As shown in FIG. 1, in some embodiments, the solar power generation system include a maximum power point tracking (MPPT) system 100, a solar PV module 200 and a grid 900. The solar PV module 200 is electrically coupled to the maximum power point tracking system 100, and the maximum power point tracking system 100 is electrically coupled to the grid 900.

In some embodiments, the solar PV module 200 is configured to receive the solar power and provide corresponding dc input voltage Vdc and input current Idc. Specifically, in various embodiments, the solar PV module 200 may include one solar panel or multiple solar panel sets coupled in series or in parallel to each other, in order to provide electricity of various power levels to the maximum power point tracking system 100.

In some embodiments, the maximum power point tracking system 100 is configured to implement the maximum power point tracking control to control the solar PV module 200 to be operated at the point with maximum power output, and convert the received electricity to an output voltage Vout to the grid 900. For example, the maximum power point tracking system 100 may provide the output voltage Vout with the same frequency and the same phase to the grid 900, such that the solar power generation system may connect to the grid.

Specifically, as shown in FIG. 1, in some embodiments, the maximum power point tracking system 100 includes a detecting circuit 120, a power converter 140, and a processing circuit 160. The detecting circuit 120 is electrically coupled to the power converter 140 and configured to detect the input voltage Vdc and the input current Idc received by the power converter 140 from the solar PV module 200. The power converter is electrically coupled to the solar PV module 200 and configured to receive the input voltage Vdc from the solar PV module 200 and convert the input voltage Vdc to the output voltage Vout. The processing circuit 160 is electrically coupled to the power converter 140 and the detecting circuit 120. The processing circuit 160 is configured to output a control signal CS to control the power converter 140 according to the input voltage Vdc and the input current Idc of the power converter 140.

Specifically, in some embodiments, the detecting circuit 120 may detect the input voltage Vdc and the input current Idc respectively by the corresponding voltage detecting unit and the current detecting unit, and output the voltage detecting signal Sig_V and the current detecting signal Sig_I correspondingly. For example, the detecting circuit 120 may include Hall elements or various sensing device, and implement the voltage or current detection accompanying with circuit elements such as resistors, and thus a further detailed explanation are omitted herein for the sake of brevity.

Thus, the processing circuit 160 may output the control signal CS to perform corresponding control to the power converter 140 according to the voltage detecting signal Sig_V and the current detecting signal Sig_I. For example, in some embodiments, the power converter 140 may include various DC-AC conversion circuits, or a DC-DC conversion circuit and a DC-AC conversion circuit electrically coupled to each other. The processing circuit 160 may switch the on or off or the switching elements in the conversion circuit of the power converter 140 via the control signal CS. Thus, by adjusting the duty cycle of the control signal CS, the input voltage Vdc may be controlled. Alternatively stated, the processing circuit 160 may achieve the control of the power converter 140 via pulse width modulation (PWM), but the present disclosure is not limited thereto. In addition, in some embodiments, the processing circuit 160 may be implemented by a digital signal processor (DSP), but the present disclosure is not limited thereto.

Figure 2:
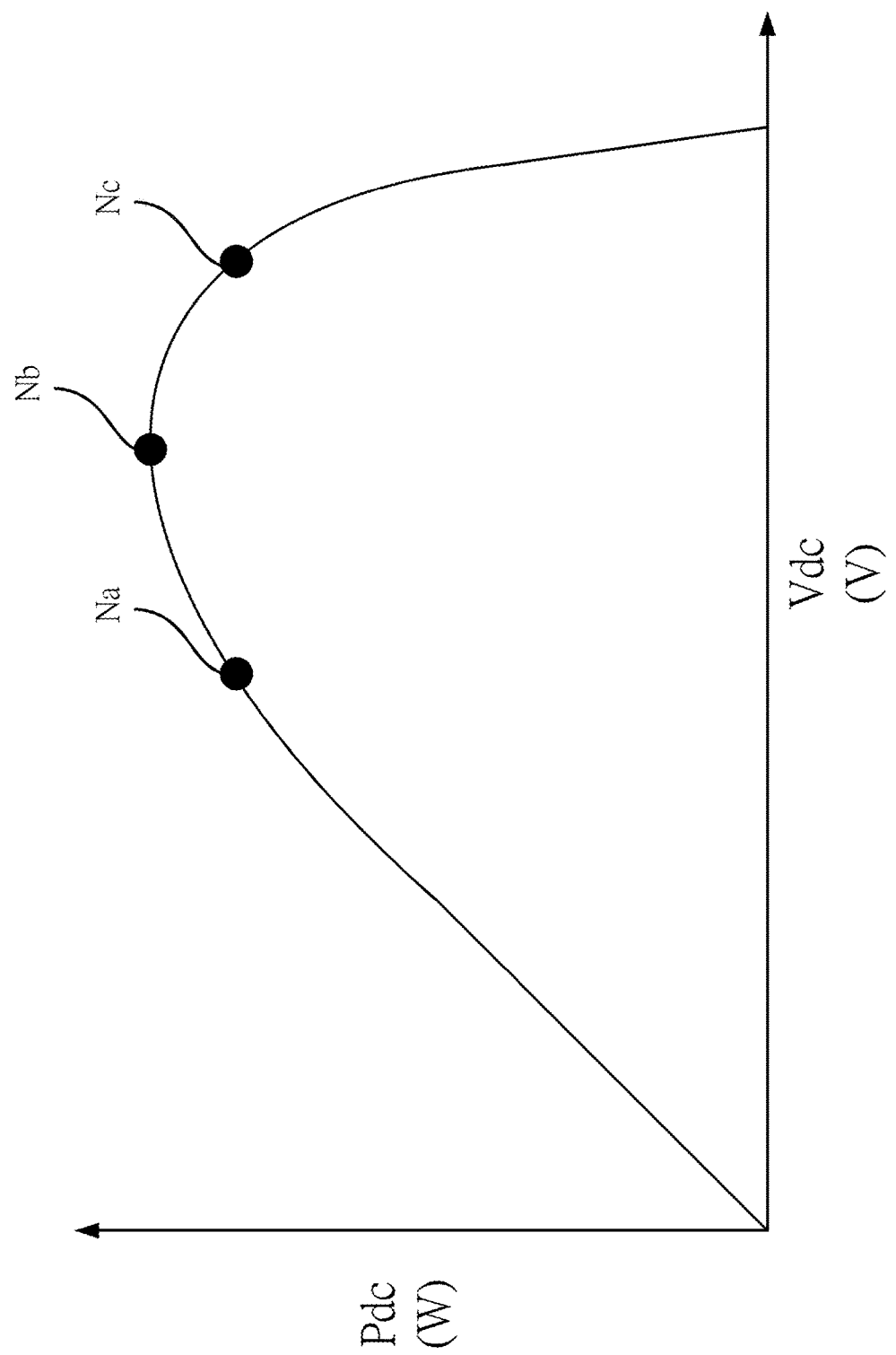
FIG. 2 is a diagram illustrating the solar power generation according to some embodiments of the present disclosure.

Reference is made to FIG. 2. FIG. 2 is a diagram illustrating the solar power generation according to some embodiments of the present disclosure. In FIG. 2, the horizontal axis indicates the input voltage Vdc, and the vertical axis indicates the power value Pdc generated by the solar PV module 200. As shown in FIG. 2, in a specific light intensity, the generated power value Pdc is different on the condition that the system is operated at different input voltages Vdc. The power value Pdc of the operating point Nb is greater than the power value Pdc of the operating points Na or Nc. Accordingly, the maximum power point tracking system 100 may control the input voltage Vdc change in a positive trend (i.e., rising gradually) or in a negative trend (i.e., falling gradually) by providing voltage disturbance, and comparing the change of the power value Pdc to achieve the maximum power point tracking to control the operating point of the system.

During the process of the digital conversion of the voltage detecting signal Sig_V and the current detecting signal Sig_I, the processing circuit 160 may misread the trend of the generated power value Pdc due to the different resolutions of the conversion. Alternatively stated, while the power value Pdc is actually rising, the processing circuit 160 may misread and determine that the power value Pdc is falling, and adjust the operating point according to the corresponding control signal CS outputted. Thus, the maximum power point tracking system 100 is not able to control the input voltage Vdc at the operating point with the maximum power output.

In some embodiments, on the condition that the processing circuit 160 is operated under a power point tracking mode, the processing circuit 160 is configured to obtain multiple power values Pdc according to the input voltage Vdc and the input current Idc, and if the obtained power values Pdc decrease for N times continuously, the processing circuit 160 is configured to provide the corresponding control signal CS, so as to change a voltage tuning direction of the power converter 140 such that the change of the input voltage Vdc switches from the positive trend to the negative trend, or from the negative trend to the positive trend, in which N is an integer greater than or equal to 2.

Alternatively stated, the processing circuit 160 only changes the voltage tuning direction of the power converter 140 if the power values Pdc decrease for 2 or more times continuously. Therefore, even the processing circuit 160 misreads the power trend for once, the processing circuit 160 may neglect the calculation result this time and keep the original voltage tuning direction. By such, the maximum power point tracking system 100 may prevent the case of operating at the non-maximum power point due to the misread of the processing circuit 160 or the detection of the local maximum. In the following paragraphs, the specific operation of the processing circuit 160 will be further discussed in accompanying with the related drawings.

Figure 3:
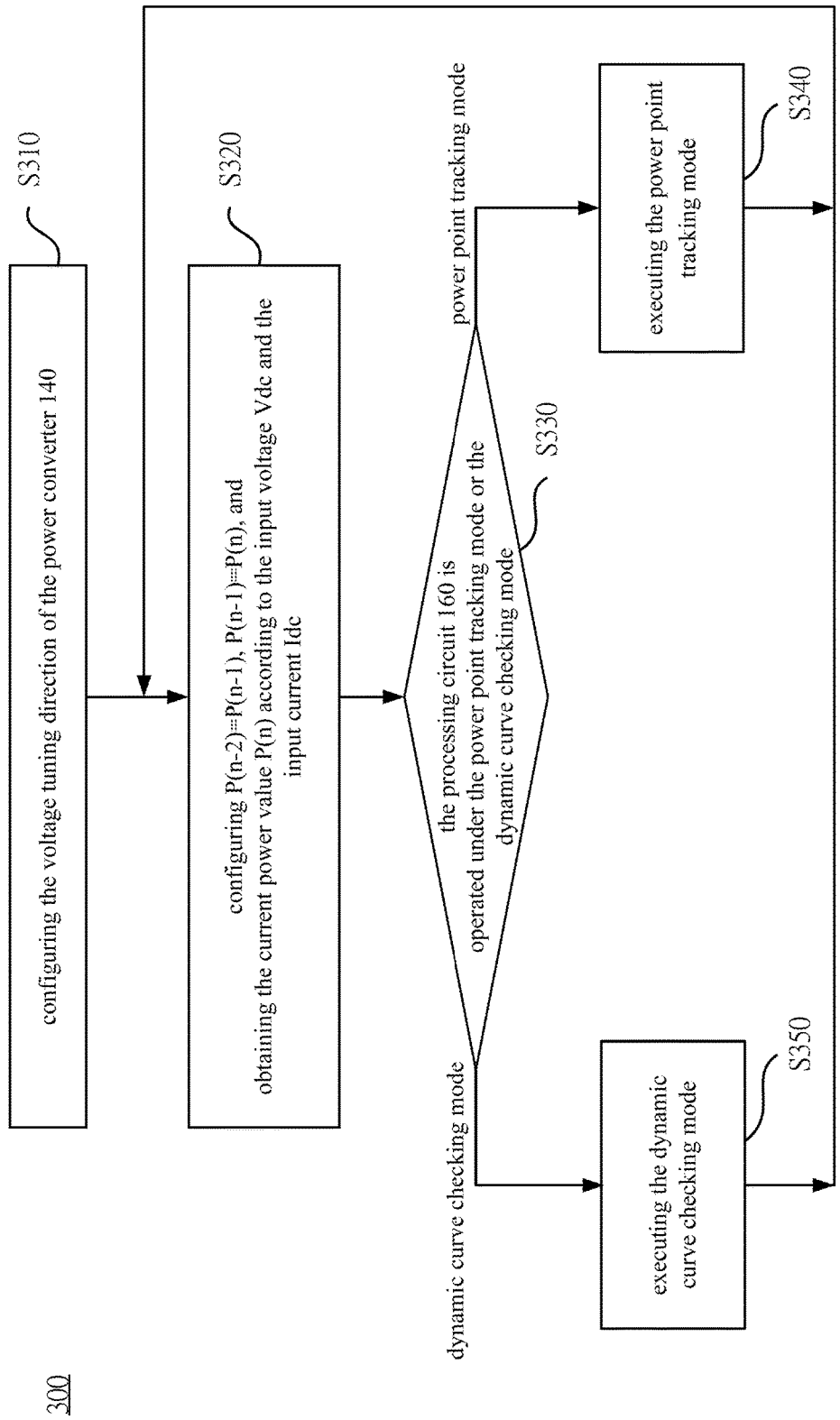
FIG. 3 is a flowchart diagram illustrating a maximum power point tracking method according to some embodiments of the present disclosure.

Reference is made to FIG. 3. FIG. 3 is a flowchart diagram illustrating a maximum power point tracking method 300 according to some embodiments of the present disclosure. For better understanding, the following maximum power point tracking method 300 is discussed in accompanying with the solar power generation system shown in the FIG. 1, but is not limited thereto. It will be apparent to those skilled in the art that various modifications and variations can be made to the structure of the present disclosure without departing from the scope or spirit of the disclosure. As shown in FIG. 3, the maximum power point tracking method 300 includes steps S310, S320, S330, S340, and S350.

First, in the step S310, the voltage tuning direction of the power converter 140 is configured by the process circuit 160 such that the input voltage Vdc of the power converter 140 changes in the positive trend or the negative trend.

Next, in the step S320, the power value Pdc is obtained by the process circuit 160 through detecting the corresponding input voltage Vdc and input current Idc of the power converter 140 by the detecting circuit 120.

For example, the processing circuit 160 may obtain a first power value P(n−2) through detecting the input voltage Vdc and the input current Idc by the detecting circuit 120 at a first time point, and obtain a second power value P(n−1) through detecting the input voltage Vdc and the input current Idc at a second time point, and obtain a third power value P(n) through detecting the input voltage Vdc and the input current Idc at a third time point.

Accordingly, each time the processing circuit 160 obtains the latest power value Pdc, the processing circuit 160 may configure the current second power value P(n−1) as the new first power value P(n−2), the current third power value P(n) as the new second power value P(n−1), and the latest power value Pdc as the new third power value P(n).

Next, in the step S330, the processing circuit 160 determines whether it is operated under the power point tracking mode or a dynamic curve checking mode. On the condition that the processing circuit 160 is operated under the power point tracking mode, step S340 is executed. On the other hand, on the condition that the processing circuit 160 is operated under the dynamic curve checking mode, step S350 is executed.

Figure 4:
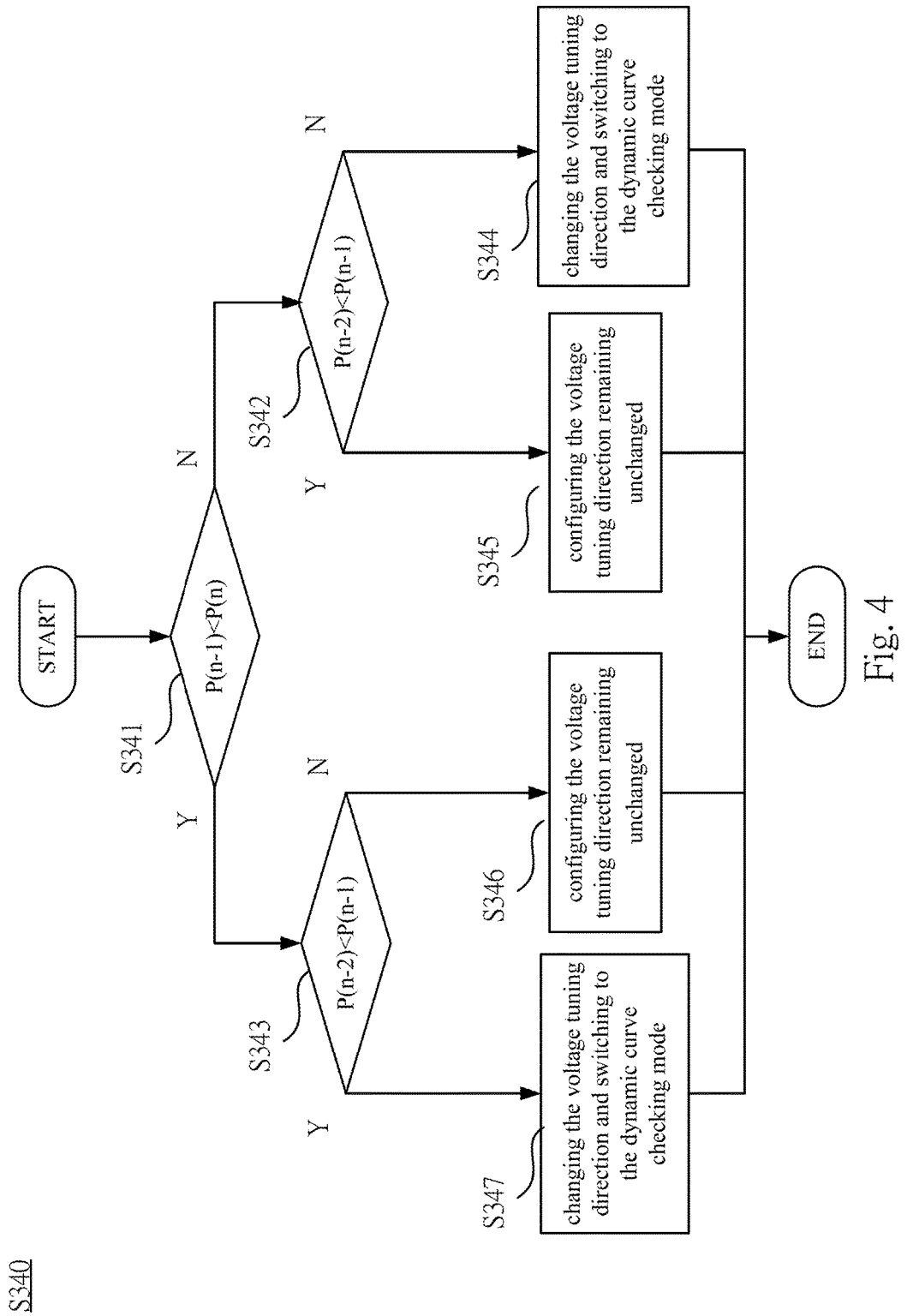
FIG. 4 is a detail flowchart diagram illustrating the step of the maximum power point tracking method according to some embodiments of the present disclosure.

Reference is made to FIG. 4 together. FIG. 4 is a detail flowchart diagram illustrating the step S340 according to some embodiments of the present disclosure. As shown in FIG. 4, the step S340 further includes steps S341, S342, S343, S344, S345, S346 and S347.

As shown in FIG. 4, on the condition that the processing circuit 160 is operated under the power point tracking mode, in the step S341, the processing circuit 160 determines whether the third power value P(n) is greater or smaller than the second power value P(n−1). Next, in the steps S342, S343, the processing circuit 160 determines whether the second power value P(n−1) is greater or smaller than the first power value P(n−2). Lastly, the processing circuit 160 selectively executes one of the steps S344, S345, S346 and S347 according to the above judgements.

Specifically, on the condition that the first power value P(n−2) is greater than the second power value P(n−1), and the second power value P(n−1) is greater than the third power value P(n), at the time the power values Pdc decrease for two times continuously. Under such situation, the processing circuit 160 executes step S344 and provides the corresponding control signal CS, so as to change the voltage tuning direction of the power converter 140, such that the change of the input voltage Vdc switches from the positive trend to the negative trend or from the negative trend to the positive trend.

It is noted that, in some embodiments, the processing circuit 160 may also determine whether to change the voltage tuning direction of the power converter 140 based on three or more times of the variation of the power values Pdc. Alternatively stated, the processing circuit is configured to change the voltage tuning direction of the power converter 140 such that the change of the input voltage Vdc switches from the positive trend to the negative trend, or from the negative trend to the positive trend if the power values decrease for N times continuously, in which N is an integer greater than or equal to 2.

In addition, on the condition that the first power value P(n−2) is smaller than the second power value P(n−1), and the second power value P(n−1) is greater than the third power value P(n), at the time the power values Pdc do not decrease continuously. Under such situation, the processing circuit 160 executes step S345 and configures the voltage tuning direction of the power converter 140 remaining unchanged.

Similarly, on the condition that the first power value P(n−2) is greater than the second power value P(n−1), and the second power value P(n−1) is smaller than the third power value P(n), at the time the power values Pdc do not decrease continuously either. Under such situation, the processing circuit 160 executes step S346 and configures the voltage tuning direction of the power converter 140 remaining unchanged.

Alternatively stated, in some embodiments, the processing circuit 160 is configured to output and provide the corresponding control signal CS, so as to configure the voltage tuning direction of the power converter 140 remaining unchanged on the condition that the number of the continuously decreasing power values Pdc does not achieve N, and keep increasing or lowering the input voltage Vdc to implement maximum power point tracking.

Figure 5:
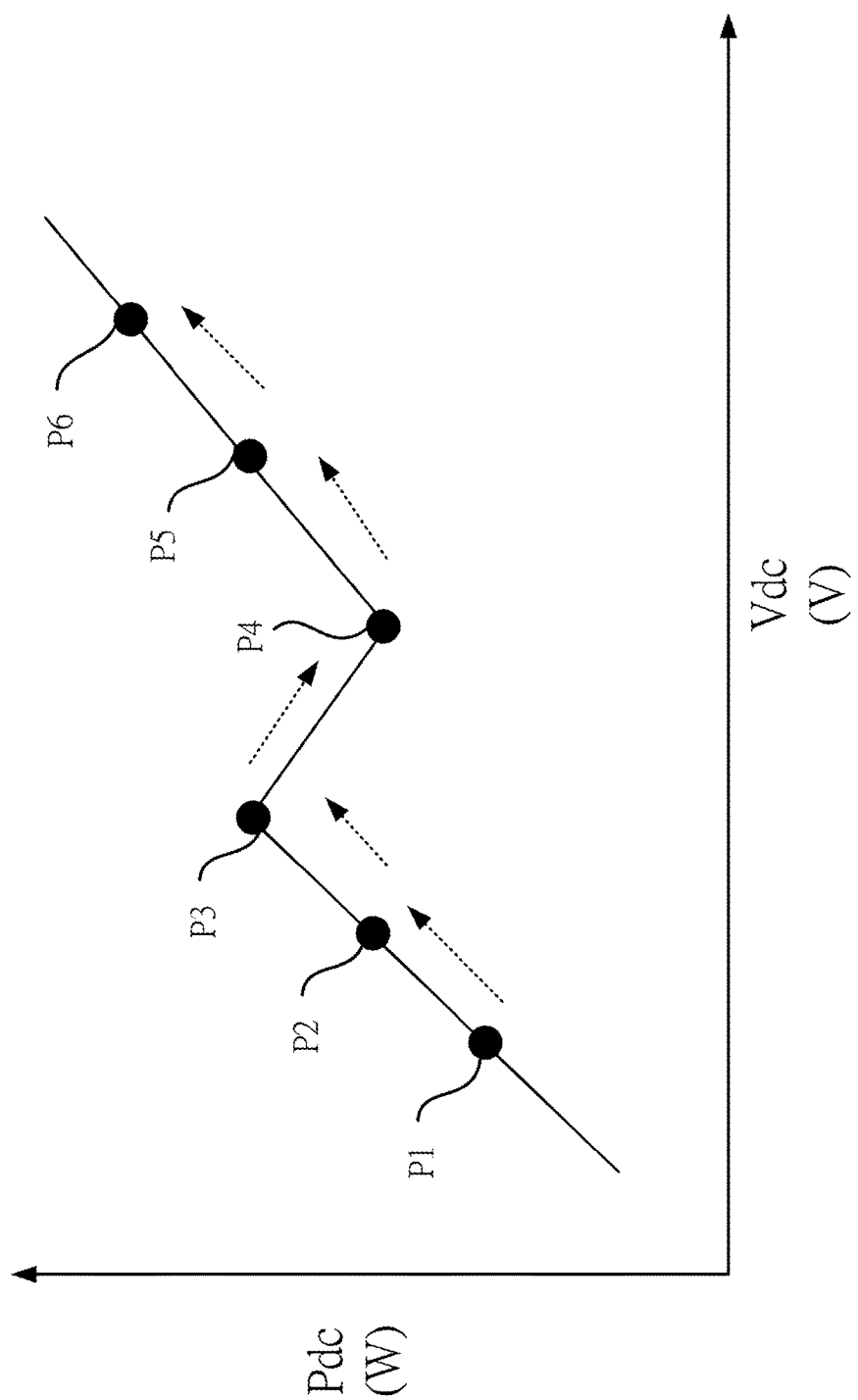
FIG. 5 is a diagram illustrating the maximum power point tracking according to some embodiments of the present disclosure.

Reference is made to FIG. 5. FIG. 5 is a diagram illustrating the maximum power point tracking according to some embodiments of the present disclosure. In FIG. 5, the horizontal axis indicates the input voltage Vdc, and the vertical axis indicates the power value Pdc generated by the solar PV module 200. As shown in FIG. 5, on the condition that the processing circuit 160 is configured to output and provide the corresponding control signal CS such that the input voltage Vdc changes in the positive trend and the input voltage Vdc is gradually increasing, the processing circuit 160 may obtain the power values P1-P6 sequentially. If the processing circuit 160 obtains the power value P4 and determines that the power value P4 is lower than the power value P3, since the number of the continuously decreasing power values Pdc does not achieve two, the processing circuit 160 keeps the original voltage tuning direction, i.e. the positive trend. Next, on the condition that the processing circuit 160 obtains the power value P5 and determines that the power value P5 is greater than the power value P4, it is known that the temporarily falling of the power value P4 may be a system detection error. Accordingly, the maximum power point tracking system 100 may keep increasing the input voltage Vdc to obtain the power P6. By repeating the operations mentioned above, the maximum power point tracking may be achieved such that the solar PV module 200 provides the maximum power value Pdc.

In some embodiments, the step S344 further includes switching to the dynamic curve checking mode, so as to execute the step S350 in the next control loop.

In addition, as shown in FIG. 4, on the condition that the first power value P(n−2) is smaller than the second power value P(n−1), and the second power value P(n−1) is smaller than the third power value P(n), at the time the power values Pdc increase for two times continuously. Under such situation, the processing circuit 160 executes step S347, switching to the dynamic curve checking mode and outputting the corresponding control signal CS, so as to change the voltage tuning direction of the power converter 140, such that the change of the input voltage Vdc switches from the positive trend to the negative trend or from the negative trend to the positive trend.

Alternatively stated, in step S344 and S347, if the obtained power values Pdc decrease or increase for N times continuously, the processing circuit 160 is configured to switch to the dynamic curve checking mode and change the voltage tuning direction of the power converter 140 according to the corresponding control signal CS outputted. The relative operations of the dynamic curve checking mode will be discussed in detail in the following paragraphs in accompanying with the drawings.

Figure 6:
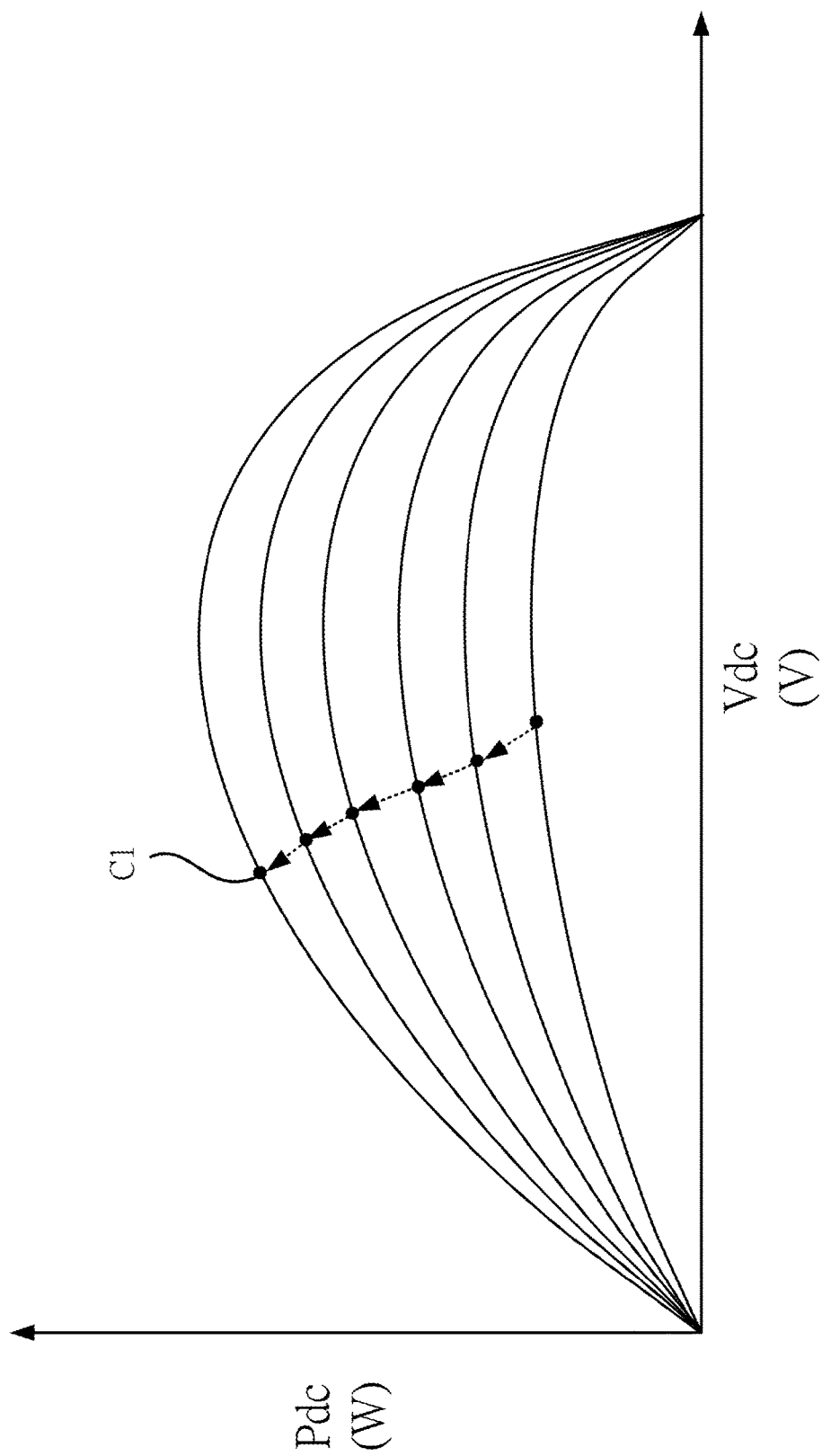
FIG. 6 is diagram illustrating the solar power generation according to some embodiments of the present disclosure.

Reference is made to FIG. 6. FIG. 6 is diagram illustrating the solar power generation according to some embodiments of the present disclosure. In FIG. 6, the horizontal axis indicates the input voltage Vdc, and the vertical axis indicates the power value Pdc generated by the solar PV module 200. As shown in FIG. 6, under the circumstance that the light intensity is changing, the power value Pdc corresponds to different power curves.

For example, as shown in FIG. 6, assuming that the light intensity is gradually increasing, the processing circuit 160 determines that the power increases and thus keep executing the power tracking along the same direction even if the voltage tuning direction is wrong, which causes the actual operating point distant from the maximum power point, as depicted in curve C1.

Accordingly, in some embodiments, the processing circuit 160 is configured to confirm whether the voltage tuning direction of the power converter 140 has to be changed by executing the dynamic curve checking mode in the step S350.

Specifically, if the power values Pdc decrease or increase for N times continuously, the processing circuit 160 is configured to determine whether the continuously rising or falling of the power values Pdc is resulted from the variation of the light condition or shading effect, and not resulted due to the correct voltage tuning direction. Therefore, at the time the processing circuit 160 may first change the voltage tuning direction back to the previous detected input voltage Vdc, and switch to the dynamic curve checking mode, in order to execute confirmation in step S350.

Figure 7:
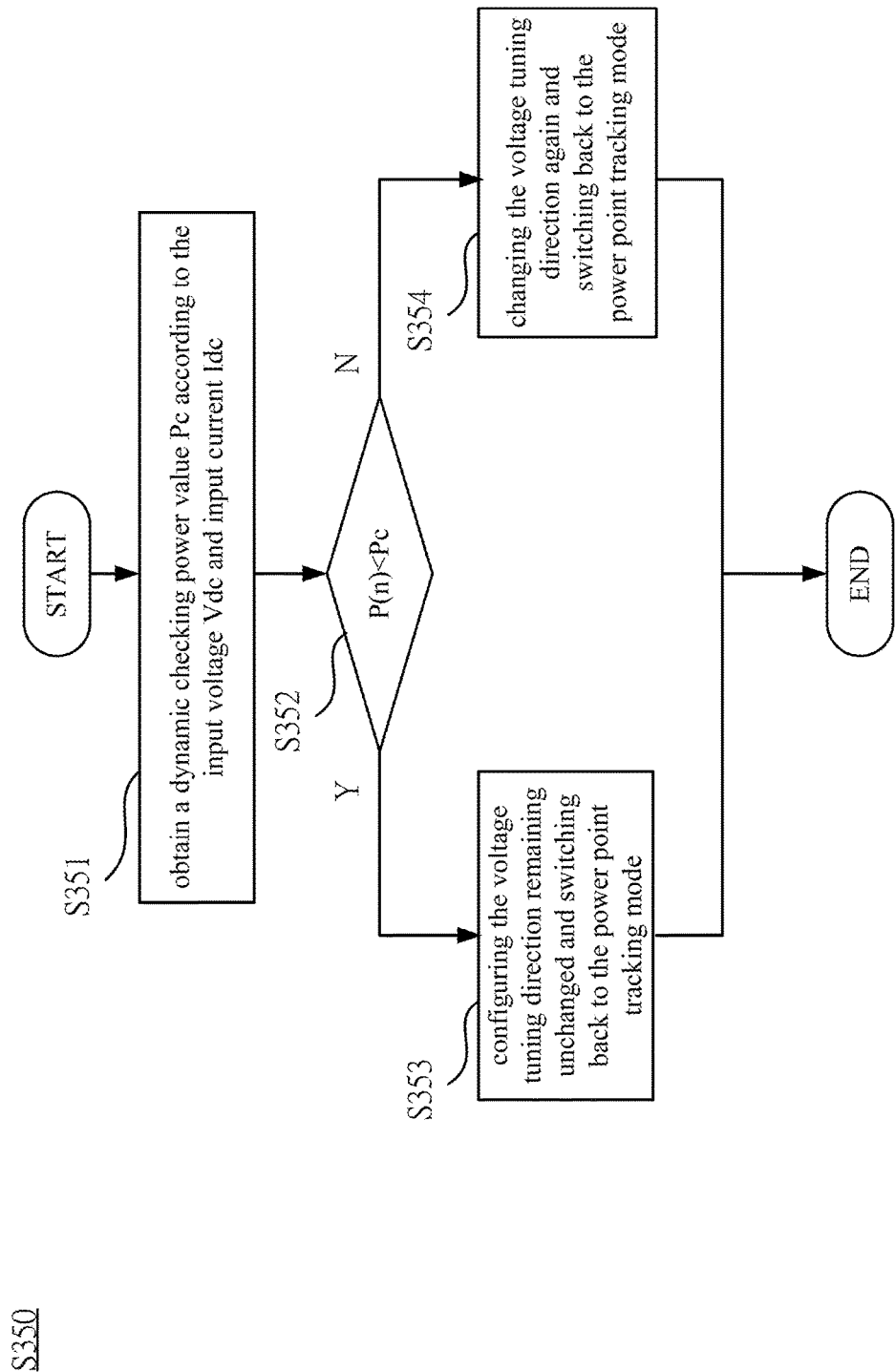
FIG. 7 is a detail flowchart diagram illustrating the step of the maximum power point tracking method according to some embodiments of the present disclosure.

Reference is made to FIG. 7. FIG. 7 is a detail flowchart diagram illustrating the step S350 according to some embodiments of the present disclosure. As shown in FIG. 7, the step S350 further includes steps S351, S352, S353 and S354.

In step S351, after the voltage tuning direction of the power converter 140 is changed, the corresponding input voltage Vdc and input current Idc of the power converter 140 is detected by the detecting circuit 120 so as to obtain a dynamic checking power value Pc.

For example, on the condition that the first power value P(n−2) is greater than the second power value P(n−1), and the second power value P(n−1) is greater than the third power value P(n), the voltage tuning direction of the power converter 140 is changed. At the time, the processing circuit 160 may be configured to detect the input voltage Vdc and the input current Idc of the power converter 140 at a fourth time point after the third time point to obtain a fourth power value as the dynamic checking power value Pc.

Similarly, on the condition that the first power value P(n−2) is smaller than the second power value P(n−1), and the second power value P(n−1) is smaller than the third power value P(n), the voltage tuning direction of the power converter 140 is changed. At the time, the processing circuit 160 may be configured to detect the input voltage Vdc and the input current Idc of the power converter 140 at the fourth time point after the third time point to obtain the fourth power value as the dynamic checking power value Pc.

Next, in the step S352, the processing circuit 160 is configured to determine whether the dynamic checking power value Pc is greater than or smaller than the third power value P(n). Lastly, the processing circuit 160 selectively executes one of the steps S353 and S354 according to the above judgements.

Specifically, the voltage tuning direction has been changed once when the processing circuit 160 is operated under the dynamic curve checking mode, and the processing circuit 160 configures the input voltage Vdc back to the previous detected input voltage Vdc. Therefore, if the power curve remains unchanged, the dynamic checking power value Pc detected should be approximately the same as the second power value P(n−1). Alternatively stated, if the power curve is unchanged, on the condition that the first power value P(n−2) is greater than the second power value P(n−1), and the second power value P(n−1) is greater than the third power value P(n), the dynamic checking power value Pc is also greater than the third power value P(n). On the other hand, on the condition that the first power value P(n−2) is smaller than the second power value P(n−1), and the second power value P(n−1) is smaller than the third power value P(n), the dynamic checking power value Pc is also smaller than the third power value P(n).

On the other hand, if the power value Pdc is changed due to the change of the power curve, the trend of the changes of the power value Pdc remains the original positive or negative trend even if the voltage tuning direction is changed. For example, if the light intensity increases, the power value Pdc increases no matter the input voltage Vdc changes along the positive trend or the negative trend. At the time, the second power value P(n−1) is smaller than the third power value P(n), and the third power value P(n) is smaller than the dynamic checking power value Pc. On the other hand, if the light intensity decreases, the power value Pdc decreases no matter the input voltage Vdc changes along the positive trend or the negative trend. At the time, the second power value P(n−1) is greater than the third power value P(n), and the third power value P(n) is greater than the dynamic checking power value Pc.

Since the control strategy of the processing circuit 160 is maintaining the power converter 140 to be operated at the maximum power output, the processing circuit 160 may output the corresponding control signal CS, so as to keep the current voltage tuning direction if the change of the power value is positive. On the other hand, the processing circuit 160 may output the corresponding control signal CS, so as to change the voltage tuning direction once again if the change of the power value is negative, in order to switch back to the original voltage tuning direction.

Alternatively stated, on the condition that the dynamic checking power value Pc is greater than the power value detected from the last time, the processing circuit is configured to execute step S353 and configure the voltage tuning direction of the power converter 140 remaining unchanged and switch back to the power point tracking mode. On the condition that the dynamic checking power value Pc is smaller than the power value detected from the last time, the processing circuit 160 is configured to execute step S354 and change the voltage tuning direction of the power converter 140 again, and switch back to the power point tracking mode.

For example, if N is 2, on the condition that the third power value P(n) is smaller than the fourth power value (i.e., the dynamic checking power value Pc), the processing circuit 160 executes step S353, configuring the voltage tuning direction of the power converter 140 remaining unchanged and switching back to the power point tracking mode.

Thus, since the voltage tuning direction is changed once when switching to the dynamic curve checking mode in the step S344 or S347, and the voltage tuning direction remains unchanged in the step S353, the voltage tuning direction of the input voltage Vdc will be the opposite direction of the initial voltage tuning direction, and therefore the operating point is avoided to be distant from the desired operating point, as shown in the curve of FIG. 6.

On the other hand, on the condition that the third power value P(n) is greater than the fourth power value (i.e., the dynamic checking power value Pc), the processing circuit 160 may determine that the power curve is not changed and the power value Pdc is changed as the input voltage Vdc changes along the same power curve. At the time, the processing circuit 160 executes step S354, changing the voltage tuning direction of the power converter 140 again by outputting the corresponding control signal CS and switching back to the power point tracking mode.

Thus, since the voltage tuning direction is changed once when switching to the dynamic curve checking mode in the step S344 or S347, and the voltage tuning direction is further changed again in the step S354, the voltage tuning direction of the input voltage Vdc will be the same direction of the initial voltage tuning direction. Therefore, after the dynamic curve checking mode, the control strategy is confirmed and back to the power point tracking mode to perform maximum power point tracking control, in which the input voltage Vdc is adjusted along the original positive or negative trend.

It is noted that, in some embodiments, the processing circuit 160 may determine whether maintain the voltage tuning direction of the power converter 140 according to two or more times of the trend of the dynamic checking power value Pc. Alternatively stated, on the condition that the trends of the dynamic checking power values Pc maintain the same for N times, the processing circuit 160 configures the voltage tuning direction of the power converter 140 remaining unchanged and switching back from the dynamic curve checking mode to the power point tracking mode. On the other hand, on the condition that the trends of the dynamic checking power values Pc changes before achieving N times, the processing circuit 160 changes the voltage tuning direction of the power converter 140 again and switches back to the power point tracking mode.

Thus, the maximum power point tracking system 100 may confirm whether the power curve is changed due to the variation of the light intensity by the dynamic curve checking mode, and avoiding the misread of the preferred operating point which may limits the increase of the power value Pdc.

Figure 8:
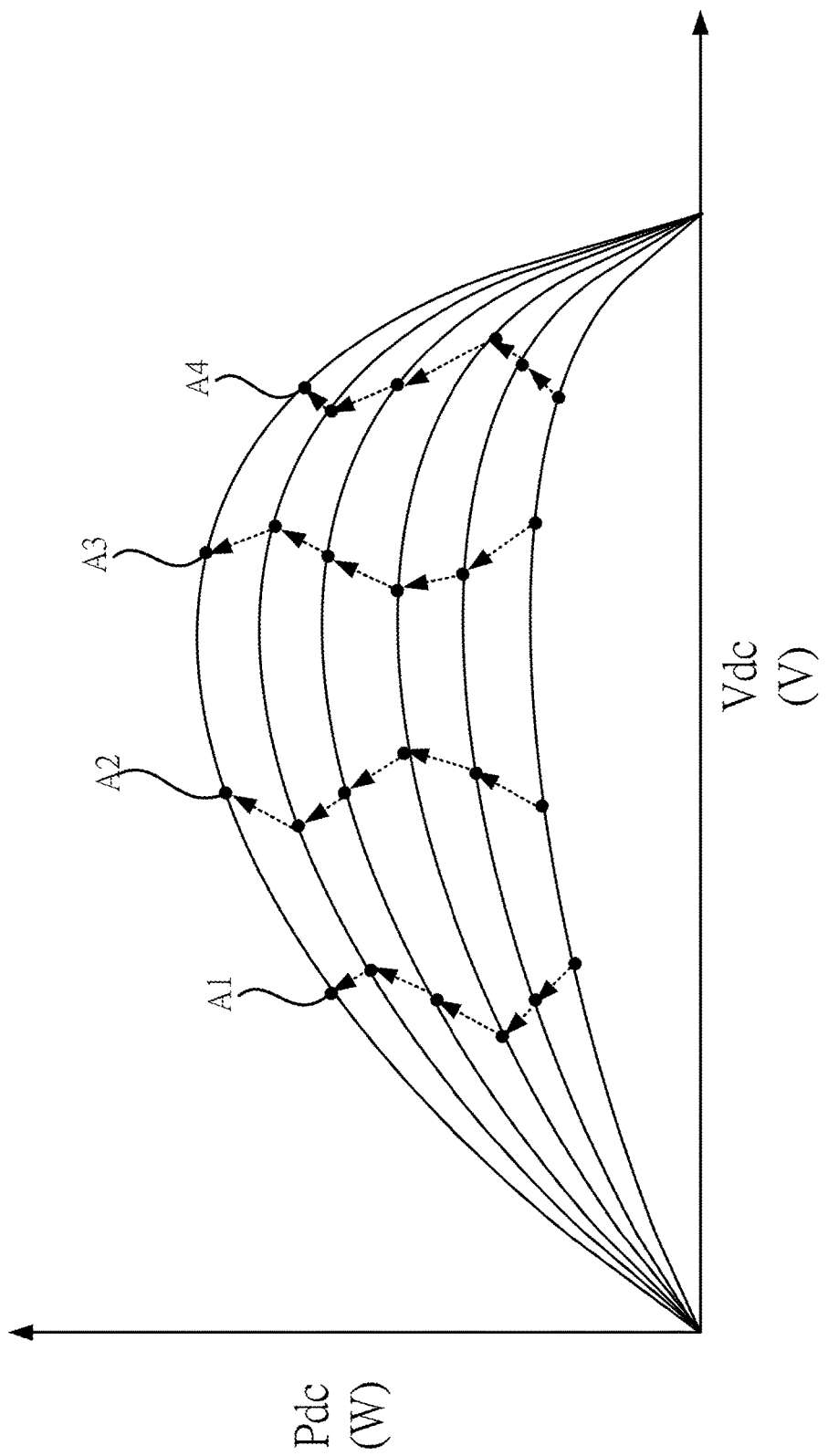
FIG. 8 and FIG. 9 are diagrams illustrating the solar power generation according to some embodiments of the present disclosure.
Figure 9:
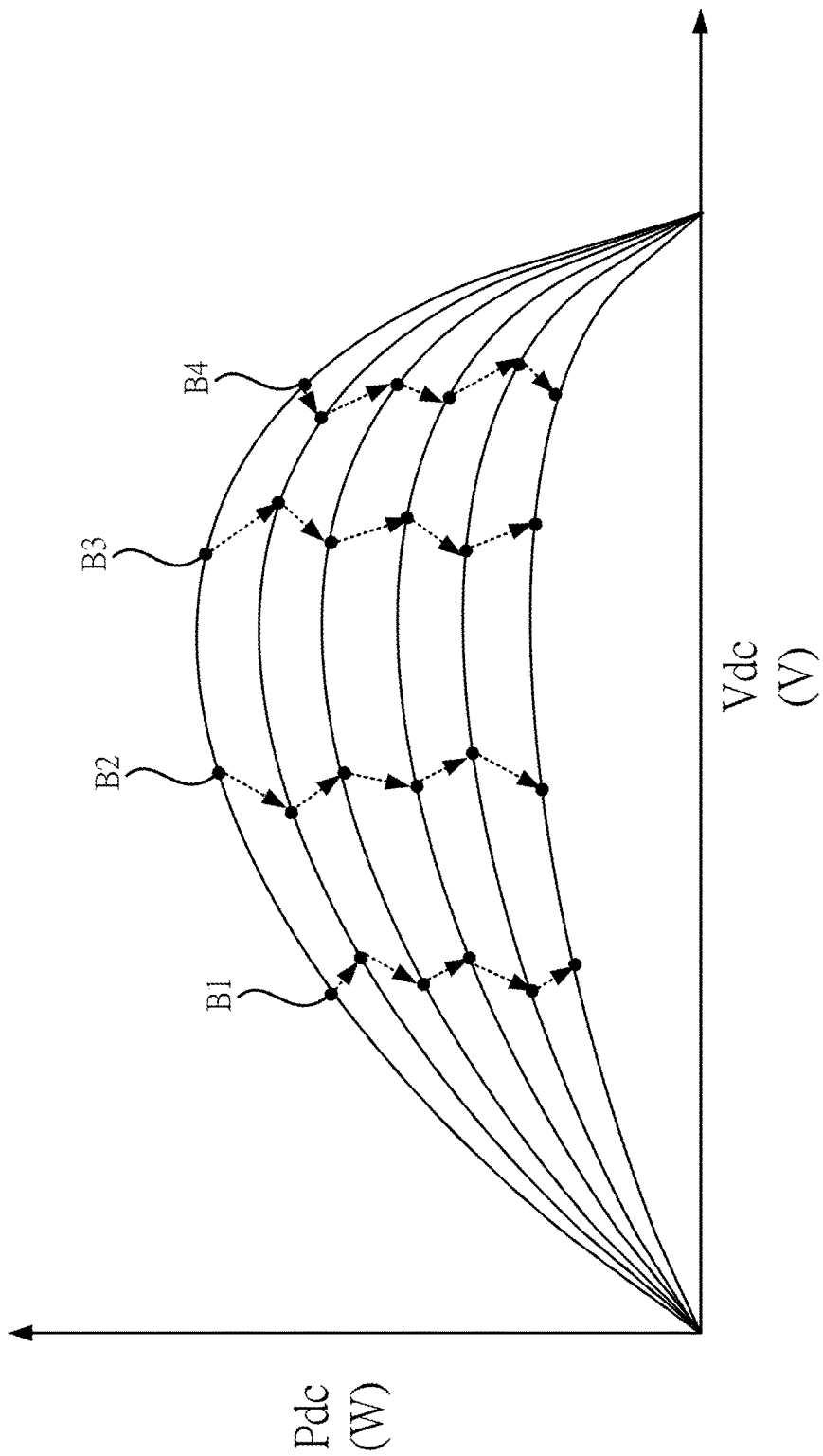

Reference is made to FIG. 8 and FIG. 9. FIG. 8 and FIG. 9 are diagrams illustrating the solar power generation according to some embodiments of the present disclosure. In FIG. 8 and FIG. 9, the horizontal axis indicates the input voltage Vdc, and the vertical axis indicates the power value Pdc generated by the solar PV module 200.

As shown in curves A1, A2, A3 and A4 in FIG. 8, during the circumstance that the light intensity increases and the overall power increases as the power curve changes, no matter the initial input voltage Vdc is lower or higher than the ideal operating point, and no matter the initial voltage disturbance is in the positive trend or the negative trend, the maximum power point tracking system 100 may switch the voltage tuning direction though the dynamic curve checking mode, in order to move toward to the ideal operating point gradually.

Similarly, as shown in curves B1, B2, B3 and B4 in FIG. 9, during the circumstance that the light intensity decreases and the overall power decreases as the power curve changes, no matter the initial input voltage Vdc is lower or higher than the ideal operating point, and no matter the initial voltage disturbance is in the positive trend or the negative trend, the maximum power point tracking system 100 may switch the voltage tuning direction though the dynamic curve checking mode, in order to move toward to the ideal operating point gradually.

In summary, in various embodiments of the present disclosure, by switching the processing circuit 160 to be operated in the power point tracking mode and the dynamic curve checking mode, no matter whether the light intensity is changed, the maximum power point tracking system 100 may avoid the misread resulted from the error generated during the conversion of the analog signals and the digital signals in the detecting process. Furthermore, when the light intensity is changed, the maximum power point tracking system 100 may also avoid the misread due to the changes of the environment light source condition. Accordingly, the maximum power point tracking system 100 may increase the accuracy of the maximum power point tracking and thus increase the generation efficiency of the solar power system.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A maximum power point tracking method comprising:
    configuring a voltage tuning direction of a power converter by a process circuit, such that an input voltage of the power converter changes in a positive trend or in a negative trend;
    detecting the input voltage and an input current of the power converter at a first time point to obtain a first power value;
    detecting the input voltage and the input current of the power converter at a second time point after the first time point to obtain a second power value;
    detecting the input voltage and the input current of the power converter at a third time point after the second time point to obtain a third power value; and
    changing the voltage tuning direction of the power converter on the condition that the first power value is greater than the second power value, and the second power value is greater than the third power value, such that the change of the input voltage switches from the positive trend to the negative trend, or from the negative trend to the positive trend.

2. The maximum power point tracking method of claim 1, further comprising:
    detecting the input voltage and the input current of the power converter at a fourth time point after the third time point to obtain a fourth power value on the condition that the first power value is greater than the second power value, and the second power value is greater than the third power value.

3. The maximum power point tracking method of claim 2, further comprising:
    configuring the voltage tuning direction of the power converter remaining unchanged on the condition that the third power value is smaller than the fourth power value.

4. The maximum power point tracking method of claim 3, further comprising:
    changing the voltage tuning direction of the power converter again on the condition that the third power value is greater than the fourth power value.

5. The maximum power point tracking method of claim 1, further comprising:
    configuring the voltage tuning direction of the power converter remaining unchanged on the condition that the first power value is greater than the second power value, and the second power value is smaller than the third power value.

6. The maximum power point tracking method of claim 1, further comprising:
    changing the voltage tuning direction of the power converter and detecting the input voltage and the input current of the power converter at a fourth time point after the third time point to obtain a fourth power value on the condition that the first power value is smaller than the second power value, and the second power value is smaller than the third power value.

7. The maximum power point tracking method of claim 1, further comprising:
    configuring the voltage tuning direction of the power converter remaining unchanged on the condition that the first power value is smaller than the second power value, and the second power value is greater than the third power value.

8. A maximum power point tracking method comprising:
    configuring a voltage tuning direction of a power converter by a process circuit such that an input voltage of the power converter changes in a positive or a negative trend;
    detecting the corresponding input voltage and input current of the power converter sequentially to obtain multiple power values by a detecting circuit; and
    on the condition that the power values decrease for N times continuously, changing the voltage tuning direction of the power converter such that the change of the input voltage switches from a positive trend to a negative trend, or from a negative trend to a positive trend, wherein N is an integer greater than or equal to 2.

9. The maximum power point tracking method of claim 8, further comprising:
    on the condition that the power values increase for N times continuously, change the voltage tuning direction of the power converter such that the change of the input voltage switches from a positive trend to a negative trend, or from a negative trend to a positive trend, wherein N is an integer greater than or equal to 2.

10. The maximum power point tracking method of claim 8, further comprising:
    configuring the voltage tuning direction of the power converter remaining unchanged on the condition that the number of the continuously decreasing power values does not achieve N.

11. The maximum power point tracking method of claim 8, further comprising:
    detecting the corresponding input voltage and input current of the power converter by the detecting circuit after the voltage tuning direction of the power converter is changed, to obtain a dynamic checking power value.

12. The maximum power point tracking method of claim 11, further comprising:
    configuring the voltage tuning direction of the power converter remaining unchanged on the condition that the dynamic checking power value is greater than the power value detected from the last time.

13. The maximum power point tracking method of claim 11, further comprising:
    changing the voltage tuning direction of the power converter again on the condition that the dynamic checking power value is smaller than the power value detected from the last time.

14. A maximum power point tracking system, comprising:
a power converter electrically coupled to a solar power module and configured to receive an input voltage from the solar power module and convert the input voltage to an output voltage;
a detecting circuit electrically coupled to the power converter and configured to detect the input voltage and an input current;
a processing circuit electrically coupled to the power converter and the detecting circuit, and configured to output a control signal to control the power converter according to the input voltage and the input current of the power converter; and
wherein the processing circuit is configured to output the corresponding control signal to control the input voltage of the power converter changes in a positive trend or in a negative trend, and obtain multiple power values according to the input voltage and the input current, on the condition that the processing circuit is operated under a power point tracking mode, the processing circuit is configured to output the corresponding control signal to change a voltage tuning direction of the power converter such that the change of the input voltage switches from a positive trend to a negative trend, or from a negative trend to a positive trend if the power values decrease for N times continuously, wherein N is an integer greater than or equal to 2.

15. The maximum power point tracking system of claim 14, wherein the processing circuit is configured to output the corresponding control signal to change the voltage tuning direction of the power converter such that the change of the input voltage switches from the positive trend to the negative trend, or from the negative trend to the positive trend on the condition that the power values increase for N times continuously.

16. The maximum power point tracking system of claim 14, wherein after the voltage tuning direction of the power converter is changed, the processing circuit is further configured to obtain a dynamic checking power value through detecting the corresponding input voltage and input current of the power converter by the detecting circuit.

17. The maximum power point tracking system of claim 16, wherein the processing circuit configures the voltage tuning direction of the power converter remaining unchanged on the condition that the dynamic checking power value is greater than the power value detected from the last time.

18. The maximum power point tracking system of claim 16, wherein the processing circuit changes the voltage tuning direction of the power converter again on the condition that the dynamic checking power value is smaller than the power value detected from the last time.

19. The maximum power point tracking system of claim 14, wherein on the condition that the processing circuit is operated under the power point tracking mode, if the number of the continuously decreasing power values does not achieve N, the processing circuit is configured to output the corresponding control signal to configure the voltage tuning direction of the power converter remaining unchanged.

20. The maximum power point tracking system of claim 14, wherein the detecting circuit is configured to detect the input voltage and the input current at a first time point, a second time point after the first time point, and a third time point after the second time point respectively such that the processing circuit obtains a first power value, a second power value and a third power value, and on the condition that that the processing circuit is operated under the power point tracking mode, the processing circuit is configured to output the corresponding control signal to change the voltage tuning direction of the power converter such that the change of the input voltage switches from the positive trend to the negative trend, or from the negative trend to the positive trend if the first power value is greater than the second power value, and the second power value is greater than the third power value.

* * * * *